Sept. 4, 1973        H. DAHMS        3,756,923

METHOD OF DETERMINING SO CONCENTRATION

Filed Nov. 30, 1970        3 Sheets-Sheet 1

INVENTOR.
HARALD DAHMS

BY *Abner Sheffer*

ATTORNEY

Sept. 4, 1973   H. DAHMS   3,756,923
METHOD OF DETERMINING SO CONCENTRATION
Filed Nov. 30, 1970   3 Sheets-Sheet 2

INVENTOR.
HARALD DAHMS
BY Abner Sheffer
ATTORNEY

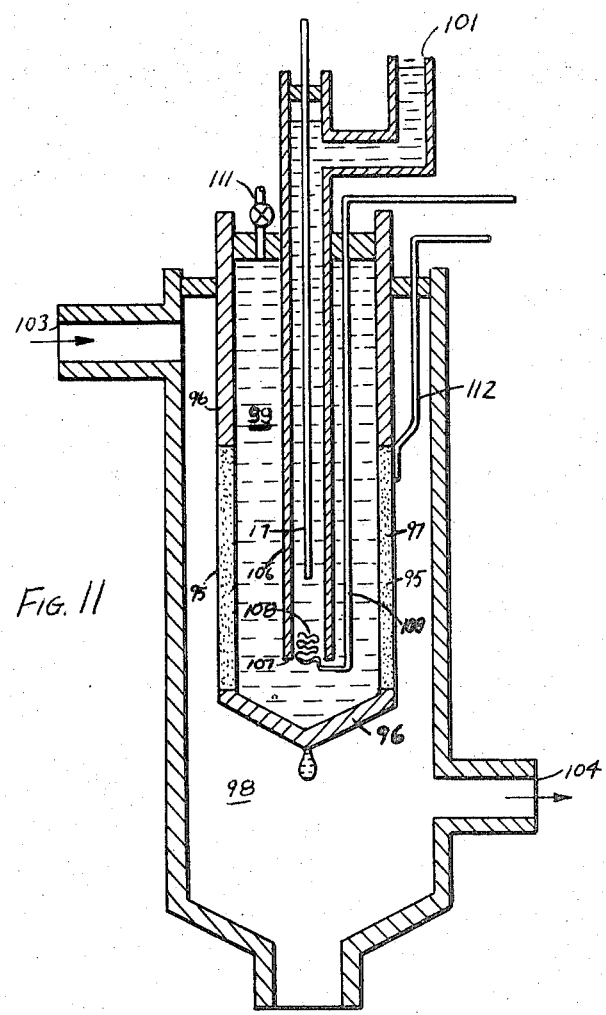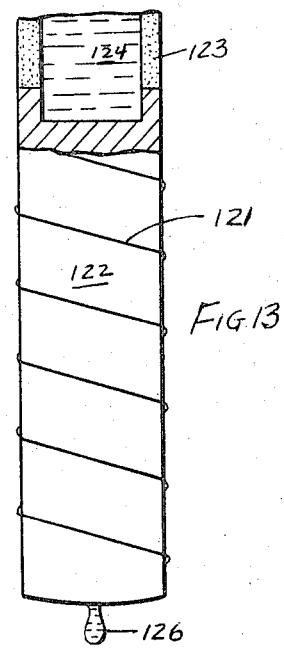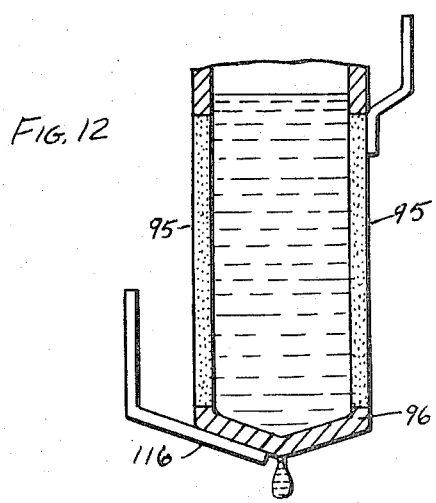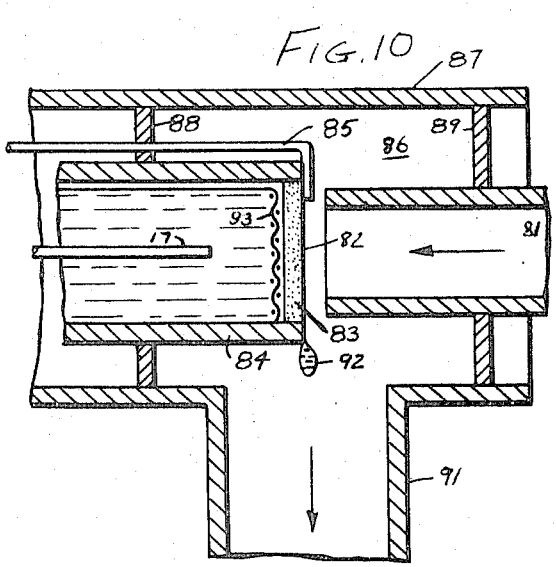

3,756,923
METHOD OF DETERMINING SO₂ CONCENTRATION

Harald Dahms, 22 Lakeview Road, Ossining, N.Y. 10562
Continuation-in-part of abandoned applications Ser. No. 718,032, Apr. 2, 1968, and Ser. No. 841,745, July 15, 1969. This application Nov. 30, 1970, Ser. No. 93,752
Int. Cl. G01n 27/46
U.S. Cl. 204—1 T                             22 Claims

ABSTRACT OF THE DISCLOSURE

A measuring cell for determining the concentration of $SO_2$ in a fluid. The cell includes an electrode covered with a thin layer of an electrolyte containing silver ions, and a counterelectrode. A voltage is applied across the electrodes and the resulting current is a measure of the concentration of $SO_2$.

---

This application is a continuation-in-part of my applications Ser. No. 718,032, filed Apr. 2, 1968, now abandoned and Ser. No. 841,745, filed July 15, 1969, now abandoned, whose entire disclosures are incorporated herein by reference.

One aspect of the present invention provides electrochemical sensors for measuring the concentration of $SO_2$ with high sensitivity, selectivity and reproducibility.

According to one aspect of this invention the sensor includes an electrode having a layer of electrolyte containing silver ions, exposed to the gas to be measured. The sensor also has a counter electrode in contact with electrolyte containing silver ions. For best results, the electrolyte is buffered to maintain the pH at a substantially constant value and prevent the acidity of the electrolyte from increasing on reaction of $SO_2$ with the system.

It is within the broader scope of the invention to use various types of electrode structures, such as the structures of the "working" electrodes described in the article by P. Hersch on galvanic analysis in "Advances in Analytical Chemistry and Instrumentation," volume 3 (C. N. Reilley, editor; published 1964 by Interscience) pages 183–249.

In one electrode structure, particularly suitable for unattended long termuse, and for compactness, lightness etc. the layer of electrolyte at the electrode (hereafter called the "electrode liquid") is confined by a membrane and the mixture to be analyzed is brought into effective contact with the outer surface of the membrane. To provide a geometrically well-defined layer of electrode liquid on the electrode I preferably employ a porous spacer. The spacer may be for example, a woven, knitted or felted or other non-woven fabric of nylon or other polymer fiber (e.g. of a fluoroethylene polymer such as Teflon, polytetrafluoroethylene) or of glass fiber or other in organic fiber, resistant to the action of the electrode liquid. The spacing may also be effected by attaching materials such as fibers or powders of glass or other resistant materials to the surface of the electrode, or even by roughening the surface of the electrode. The thickness of the layer of electrode liquid is preferably less than 3 mm., more preferably below 1 mm., e.g. 0.04 mm.

The electrode surface may be of noble metal (e.g. platinum or gold) or of other corrosion-resistant material such as graphite.

The membrane may be of highly permeable material such as silicone rubber, (e.g. a substantially ion-impermeable membrane, about 0.05 mm. in thickness and free of holes, of silicone rubber which has the following permeability rates [expressed as cc. of gas per second, passing through a membrane under a pressure difference of 1 cm. of Hg per square centimeter per centimeter thickness of membrane at 25° C.]: $N_2$, $25 \times 10^{-9}$; $He$, $30 \times 10^{-9}$; $O_2$, $50 \times 10^{-9}$; $H_2$, $55 \times 10^{-9}$; $SO_2$, $1500 \times 10^{-9}$; $CO_2$, $270 \times 10^{-9}$; $H_2O$, $3000 \times 10^{-9}$; $CH_4$, $80 \times 10^{-9}$; $C_4H_{10}$, $750 \times 10^{-9}$). Another suitable membrane is of Teflon (polytetrafluorethylene), such as the 0.025 mm. membrane supplied by Radiometer Company of Copenhagen, Denmark; this membrane is considerably less permeable than the silicone rubber membrane. Still other membranes are of fluorosilicones, for example.

It is also within the broader scope of the invention to retain the thin layer of electrode liquid on the electrode without using a membrane. A porous spacer can retain the liquid simply by capillary action, with fresh liquid penetrating along the spacer from a counter-electrode compartment to replace liquid lost by evaporation or by leakage. The structure of the electrode may be also relied upon to retain this layer without using a spacer; for example, one may use a liquid-retaining wire gauze electrode having a surface of appropriate wetting characteristics. The thickness of the layer need not be uniform and the layer need not be continuous. It is desirable, however, that the dimensions of the layer do not change during the test period. Loss of water by evaporation from the film of electrode may be reduced, when necessary, by using the device in a wholly or partially saturated atmosphere (e.g. by adding water vapor to the sample to be tested) or by reducing the water vapor pressure in the electrode liquid by suitable additions or replacing part or all of the water in that liquid by less volatile liquids.

In a particularly suitable structure, without a membrane, the electrode is porous and the electrode liquid flows through it. Thus the electrode may be a noble metal such as platinum deposited on the outside porous substantially inert body such as microporous fritted glass, porous porcelain etc. to the inside of which there is continuously supplied fresh electrode liquid under pressure so that the liquid is forced through the porous body and into intimate contact with the microporous metal, while the gas whose $SO_2$ content is to be measured flows over the wet porous electrode. The counter electrode may be positioned in the electrode liquid upstream of the porous electrode and the electrode liquid may be discarded after it passes over the porous electrode (e.g. it may drop off the surface of the electrode and be discarded). The counter electrode may also be located downstream of the porous electrode, and, in this case, preferably close to the latter; for example, there may be a thin film of downwardly flowing electrode liquid on a supporting body, leading from the porous electrode to the counter electrode and the electrode liquid may then drop off the surface of the counter electrode and be discarded.

The porous electrode structure may be employed not only with electrode liquids containing silver ions and for measurement of $SO_2$, but also with the electrode liquids described in my parent application Ser. No. 718,032 as well as with the electrode liquids used in prior art devices (such as known oxygen, ozone, and nitrogen dioxide sensors), for measurement of various species with appropriate electrode liquids. By the use of such porous electrodes with flowing electrolyte, as described above, I have obtained very high stability of current output, low background current, low response time even with extreme changes in concentrations to be measured and improved freedom from interference from other species, as well as high sensitivity. The background current can be decreased still further by the use of a third electrode (as described below) which is maintained at about the same potential as the porous electrode and which may be situated between the counter electrode and the porous electrode or even upstream of the counter electrode (as in a tube continuously feeding the fresh electrolyte to the system). This arrangement using a third electrode is effective not only for measurement of $SO_2$ but in systems using other electrolytes, well known to the art, for measuring other species. For example, the third electrode is especially useful when the electrolyte is contaminated with the same component as that which is to be measured, as in measuring oxygen concentrations in a gas, using a flowing electrolyte which has not been freed of dissolved oxygen.

As mentioned earlier, other electrode structures known to the art may be used, e.g. those disclosed in Heller U.S. Patent 2,651,612. Here too the use of the third electrode is advantageous. Various configurations of the third electrode may be employed; thus good results are obtained by using platinum wire gauze or curled up platinum wire.

For most purposes the area of the layer of electrode liquid on the electrode will be in the range of about 1 mm.$^2$ to 500 mm.$^2$ when the membrane-covered structure is used and this layer of liquid will cover substantially the entire face of the electrode. The use of larger effective areas of electrode liquid will generally give a higher ratio of response current to background current. When employing the porous electrode structure described above, the apparent area (i.e. the area given by the overall dimensions of the porous electrode, not taking into account the surface roughness and porosity) is for most purposes in the range of about 0.1 cm.$^2$ to 100 cm.$^2$, typically about 10 cm.$^2$.

The preferred, and simplest, means of measuring the amount of $SO_2$ is to apply a steady predetermined voltage to the electrodes and to measure the current. However one may also apply the voltage intermittently; for example one may apply the voltage for a short period such as 10 seconds, after exposing the cell to the mixture to be tested for a longer period (such as one minute) during which no voltage is applied to the electrodes. In the latter case the current will be higher than when the measurement is made at a constantly applied voltage of the same numerical value. The variation need not be stepwise but can be in any predetermined pattern. In any case, the numerical value of the current at a predetermined time during the application of the voltage will give a comparable (and calibratable) indication of the concentration of the selected component in the mixture being tested. Instead of measuring an instantaneous value of current, one may measure an integrated value of the current over a given time during its flow, in well-known manner, e.g. mechanically, electronically (by integrating operational amplifiers) etc.

It is possible, particularly by the use of an extended microporous electrode, to obtain a response substantially equal to the theoretical maximum, that is a response in which all molecules of $SO_2$ in the gas mixture react at the porous electrode. I believe that in the use of the extended, highly responsive, electrode any $SO_2$ molecules that do not at first enter into reaction at the electrode can make later reactive contact with the electrode liquid and electrode downstream. Because of this substantially coulometric response (in which substantially all available charges are measured) I can measure the concentration of $SO_2$ without the need for close control of the temperature at which the measurement is made and without the need for calibration. That is, at a given flow rate, the current response is proportional to the number of $SO_2$ molecules supplied, which is of course proportional to the concentration, as given in Faraday's law. As a corrollary the response is proportional to flow rate and the device thus may be used as a flow-meter if desired. Of course, it is also possible to use very high flow rates at which (unless a correspondingly long zone of contact with the electrode liquid at the electrode is provided) the current response will be significantly less than 100% of the theoretical maximum.

Preferably, the voltage between the counter-electrode and the electrode carrying the layer of redox material is at least 10 mv. and is not so great as to cause electrolytic decompositions of the water or other medium. The applied voltage (which is most preferably not above about 0.5 volt) can be furnished by any suitable external source such as a storage battery.

In the drawings which illustrate certain forms of the invention:

FIGS. 10, 11 and 12 are schematic cross-sectional views of structures having a porous electrode.

FIG. 13 is a schematic view of a structure in which the electrode carrying the layer of electrolyte is in the form of a long wire.

Figure 1:
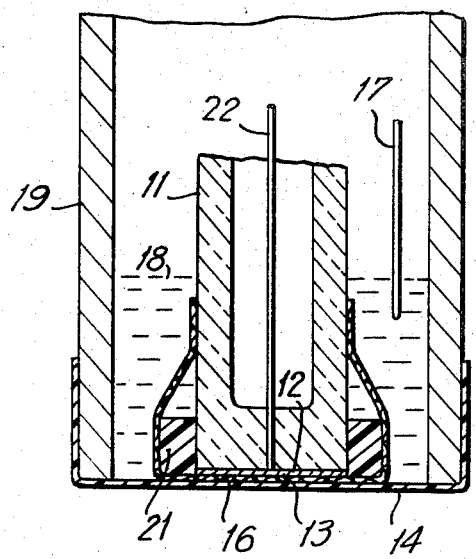
FIG. 1 is a schematic view, in elevation and partly in cross section, of a measuring cell of this invention.

The structure 10 of FIG. 1 comprises an insulating rod 11 having at the bottom thereof an electrode 12 which is in contact with a thin layer 13 of liquid supported by a membrane 14 which is permeable to $SO_2$. The membrane 14 is spaced uniformly a short distance from the electrode 12 in any suitable manner such as by means of a porous layer of inert fabric 16 or other fibrous material. A counter-electrode 17 is situated within a body 18 of the same liquid contained within an insulated outer casing 19, at the lower end of which the membrane 14 is supported. To lengthen the diffusion path between the thin layer 13 of liquid and the main body 18 of that liquid an insulating spacer 21 is mounted around the rod 11. A wire lead 22 runs through the rod 11 into electrical contact with the electrode 12.

Figure 2:
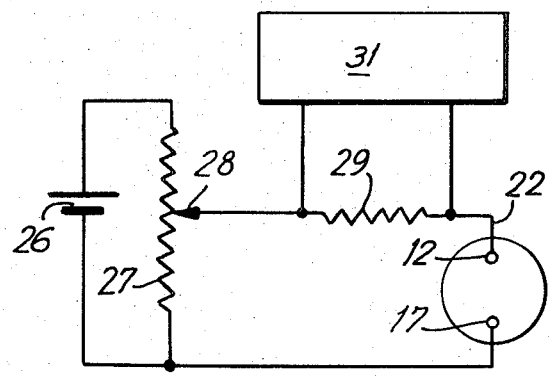
FIG. 2 is a diagram of an electrical circuit to be used with the measuring cell.

As shown in FIG. 2, a substantially constant voltage is supplied between the electrode 12 and the counter electrode 17, as by means of a circuit containing a storage battery 26 and a resistor 27 having an adjustable contact 28. The current that flows through the electrodes is measured in any suitable manner; e.g. this current also passes through a small fixed resistor 29 and the resulting IR drop across the resistor 29 is measured by a conventional meter 31 (e.g. a high impedance millivolt meter) which serves as a sensitive galvanometer.

Figure 3:
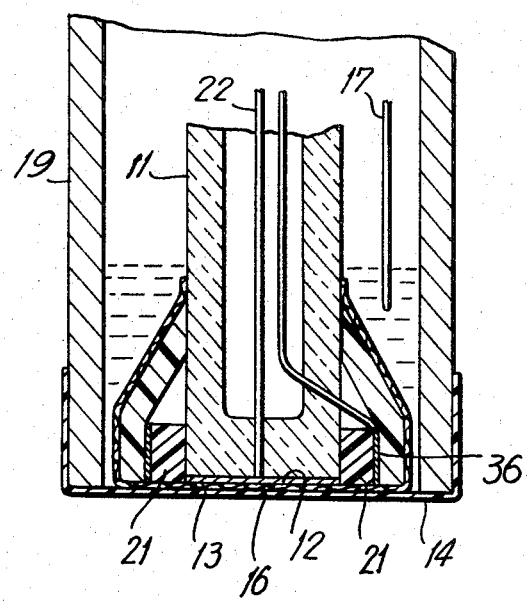
FIG. 3 is a schematic view, in elevation and partly in cross section, of an improved measuring cell having a "guard" electrode.
Figure 4:
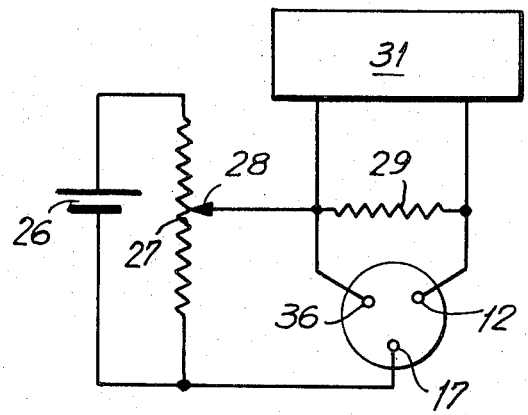
FIG. 4 is a diagram of an electrical circuit to be used with the measuring cell of FIG. 3.

FIGS. 3 and 4 illustrate the use of a third electrode to decrease the background current of the device, possibly by reducing diffusion between the two electrodes. In the structure shown in FIGS. 3 and 4 the arrangement of the electrode 12 and counter-electrode 17, etc., is similar to that of FIG. 1. A third electrode 36 is placed between the electrode 12 and the counter-electrode 17 and is maintained at about the same potential as the electrode 12, as (see FIG. 4) by connecting the third electrode 36 on one side of the small resistor 29 so that the current flowing between the third electrode and the counter-electrode does not pass through the resistor 29 and thus does not affect the reading of meter 31. It will be understood that in the preferred embodiment the IR drop across resistor 29 is only a small fraction (e.g. 1%) of the voltage between electrodes 12 and 17 and that the voltage between electrodes 36 and 17 is therefore substantially the same as that between electrodes 12 and 17. The third electrode 36 is situated so that species diffusing between the counter-electrode 17 and the electrode 12 have to pass over it. In FIG. 3 it is in the form of a cylinder (which may be a piece of noble metal foil, e.g. of platinum or gold, wrapped around the insulating ring 21) which is protected by an insulated collar, so that only the thin lower edge of this cylinder is in contact with the liquid; by limiting the contact to the thin circular line of that lower edge the current flowing through the third electrode is reduced and unduly large currents are avoided.

Figure 5:
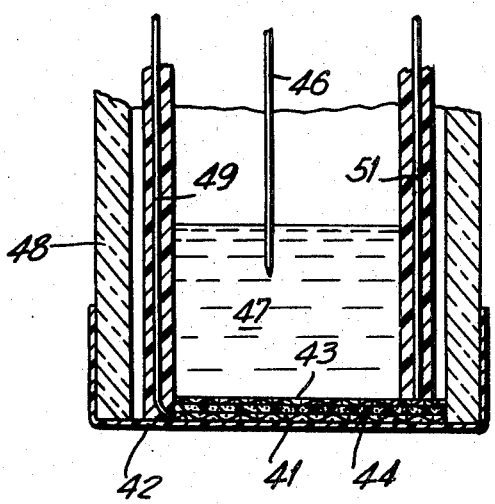
FIG. 5 is a schematic view, in elevation and partly in cross section, of another form of measuring cell using a guard electrode.

FIG. 5 illustrates another physical arrangement, employing a third electrode, particularly designed for use when there is a high rate of transport of the liquid toward the electrode which is close to the membrane. In this arrangement the first electrode 41 is a fine platinum wire mesh resting on the membrane 42. Spaced a little above this first electrode is another fine platinum wire mesh 43 which serves as the third electrode; it is kept away from direct electrical contact with the first electrode 41, by means of a spacer which may be a fine porous gauze 44 of inert plastic or glass. This assembly, together with the counter-electrode 46, is immersed in the liquid 47, e.g. in a tubular insulating container 48. The first and third electrodes 41 and 43 are connected to the external circuit (which may be identical with that shown in FIG. 4) by means of electrically insulated wire leads 49 and 51, respectively. This type of arrangement also helps to prevent the membrane from running dry when operated at high temperatures at which there is an increased loss of water through the membrane (the water being lost as vapor from the underside of the membrane).

The utility of the third electrode is not limited to use with the novel electrode liquid systems described herein. It may also be employed in the conventional oxygen-measuring electrode system such as that shown in Clark U.S. Pat. 2,913,386.

In the initial operation of the measuring devices the background current (i.e. the current flowing when the device is exposed to an environment, such as pure air, substantially free of the constituent which it is intended to measure) is often at first relatively large and decreases over a period of time to a much lower level, which may be, for instance, about one tenth or one hundredth of the initial current. I believe this to be due to an "auto-purification" of the electrode liquid owing to the flow of the background current. The system containing silver ions is superior in attaining low levels of background current rapidly.

Figure 7:
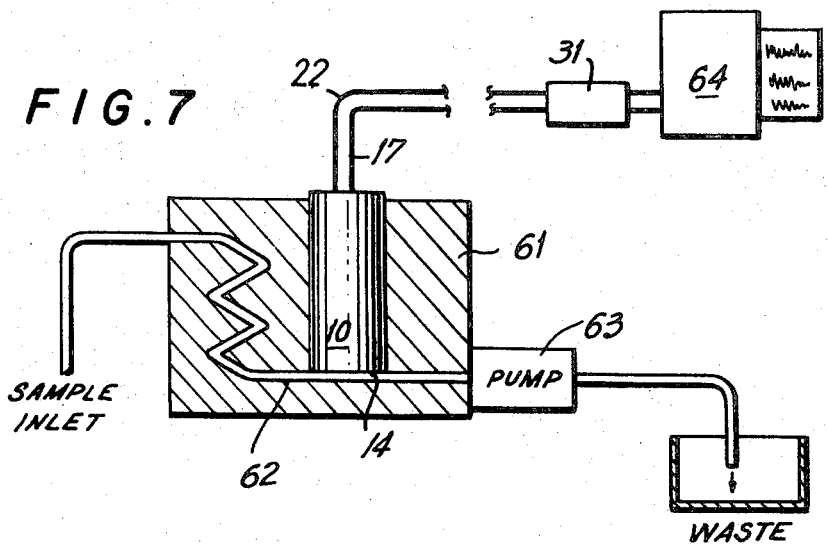
FIG. 7 is a schematic view, in elevation and partly in cross section, of an arrangement for bringing the measuring cell into operative association with the sample to be analyzed.

The measuring device is desirably employed in an apparatus containing means for transporting the sample into contact with the outer (non-electrode) side of the membrane and means for maintaining the sample and the measuring device at a predetermined temperature. Means for discharging the sample and for calibrating the device may also be provided. Thus, in the apparatus shown in FIG. 7, there is a constant temperature zone such as a heated metal block 61 whose temperature is controlled by a thermostat. There is also a passageway 62 for the sample (and any blanks and standards which may be employed) and a pump 63 for transporting these fluids through the passageway, preferably at a constant rate. One portion of a wall of the passageway 62 is formed by the membrane 14 of the measuring device 10 which is situated in a cavity in the block 61. The current measuring device (e.g. a high impedance millivolt meter 31) may be connected to a strip recorder 64. It will be understood that if a constant temperature cannot be maintained at the measuring device (sensor) well known electronic circuits may be used to compensate for changes in sensor response with temperature, such as the circuits using thermistors which are known to those skilled in the art.

Figure 8:
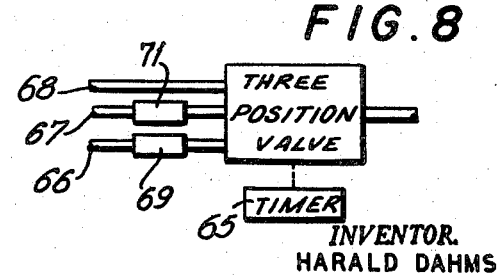
FIG. 8 is a schematic view of an arrangement for providing calibrating fluids and samples for use in the measuring cell.

Calibration can occur automatically at predetermined times by the use of an arrangement shown in FIG. 8. Here an automatic timer 65 controls a three-position valve having three inlets (66, 67 and 68) and discharging into passageway 62 of FIG. 7. One inlet has a filter 69 for removing the $SO_2$ from the atmospheric air drawn through the filter by the action of the pump; a well known alkaline filter may be used. The second inlet 67 is connected to a controlled source 71 of the $SO_2$, such as a permeation tube of the type described by B. E. Saltzman in Environmental Science and Technology 2, 23 (1968) which releases the $SO_2$ at a predetermined constant rate so that when the air flow is maintained at a known constant rate there is a predetermined known concentration of the $SO_2$ in the air supplied to the membrane 14 through passageway 62. The third inlet is open to the atmosphere. Thus the cycle of operation may be to operate the valve at suitable intervals to connect first inlet 66 and then inlet 67 to the passageway 62 to calibrate the apparatus and then to return the valve to its usual position in which air is drawn through inlet 68 continuously most of the time (or intermittently), the pump being controlled by the timer or by remote control, etc. It will be understood that other sources of gas for calibration may be connected to inlets 66 and 67, e.g. gas cylinders containing pure air and air contaminated with a fixed amount of $SO_2$.

No special counter-electrode construction is needed in the practice of my invention. The counter-electrode may be simply of bare corrosion-resistant metal, such as platinum or silver wire. In this invention the potential at the counter-electrode is always well defined because of the presence of the reducible silver ion at the counter-electrode; this results, I believe, in the electro deposition of silver on the surface of the counter-electrode.

Figure 9:
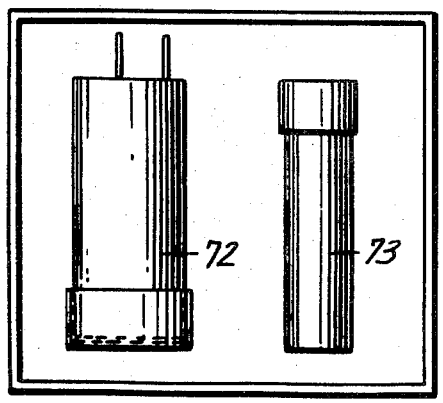
FIG. 9 is a schematic view of a kit containing a measuring cell structure in dry condition and an electrolyte for use therein.

The measuring cells of this invention may be supplied to analysis in "dry" or "wet" form. In the wet form the electrode spacer-membrane-counter electrode assembly has the silver ion-containing electrode liquid in contact with the electrodes. In the dry form this liquid is not in such contact, but is to be added, when needed, to the assembly. In the latter case it is convenient to supply a kit which may be a box (see FIG. 9), or other container, or other support (e.g. a card) carrying the assembly 72 and also carrying a bottle 73, or other container, of the electrode liquid. An instrument for transferring the liquid to the assembly may also be included in the kit together with containers for other electrode liquids to be substituted in the same assembly.

Figure 6:
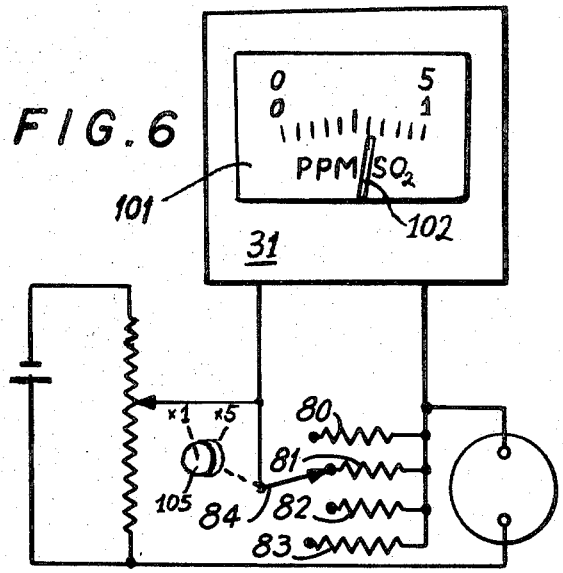
FIG. 6 is another circuit diagram for use with the measuring cell of FIG. 1.

As shown in FIG. 6 another circuit employs a set of resistors 80, 81, 82, 83 of different resistance values and a switch 84 for selectively including any one of these resistors in the circuit. The IR drop across the selected resistor is sensed and amplified by a suitable device 31, which may be any conventional stable high impedance amplifier. Preferably, one selects the appropriate resistor in the light of the expected current so as to insure that this IR drop is small, most preferably in the range of below 50 mv.

In the electrolyte the silver ion concentration is desirably at least $10^{-5}$ M a concentration less than about 0.1 M, and particularly in the range of about $3 \times 10^{-2}$ M to $10^{-3}$ M has given very good results.

The preferred buffer is a phosphate buffer such as is obtained by dissolving $Na_2HPO_4$ in water (e.g. at 0.1 M concentration) and adding $H_3PO_4$ thereto. Preferably the pH is within the range of about 1.5 to 6, and less than the pH at which precipitation of silver occurs in the particular buffered system, but, for highest response, is at least within about 2 pH units of the value at which such precipitation takes place. A pH of about 2.7 has proved to be very satisfactory. The buffer should be one that does not itself react, chemically or electrochemically, at the electrodes under the conditions of operation. Other buffers of this type will be apparent to those skilled in the art.

It is within the broader scope of this invention to have other ions or constituents present in the electrolyte. For example, the system works well when other metal ions e.g. copper ions are present in addition to the silver. The dissolved anions in the electrolyte may be for example, phosphate, nitrate, etc. Preferably the anion is substantially unreactive with the electrodes under the conditions of use.

The sulfur dioxide sensors described herein may be part of other analytical apparatus. For instance, such a sensor may be used in an apparatus for the analysis for sulfur content in organic materials, in which a known amount of the organic material is burned in an air stream and the combustion products are passed to the $SO_2$ sensor.

The following examples are given to illustrate some aspects of this invention. In all the examples room temperature (about 22° C.) was used and the pressure was atmospheric, unless otherwise noted.

EXAMPLE 1

In this example, the electrode was constructed by heat-sealing a short piece of platinum wire 22 in the lower end of a piece of glass tubing which served as the rod 11. The outer diameter of the glass tube was 7 mm. The glass at the closed, sealed end of the tubing was then ground plane retaining the diameter of 7 mm. and a solution containing $PtCl_4$ in acetone (e.g. 0.1 g. $PtCl_4$ per ml. of acetone) was applied to most of that ground end, being applied as a concentric disc of 5 mm. diameter onto the ground end, which was then exposed to moderate heat over a conventional Bunsen burner to decompose the platinum compound, forming a thin layer of metallic platinum. The resulting electrode was then brought to red heat over the Bunsen burner to insure good adhesion of the platinum to the glass. The resulting thin circular platinum electrode had a diameter of 5 mm. The unplatinized glass rim of about 1 mm. width served as spacer with respect to the solution. A piece of thin ordinary knit sheer nylon ladies hosiery material (e.g. knit 45 denier nylon), serving as the spacer 16, was then fixed over the electrode and held on the rod (e.g. by a rubber band or other holding device). The resulting assembly was then placed in the cylindrical glass outer tube 19 (whose inner diameter was 9 mm.) with the assembly pressed lightly against the membrane 14 at the bottom of the platinum electrode; the distance between the electrode and the membrane was determined by the thickness of the knit nylon spacer 16 which was about 0.04 mm. The membrane 14 was of silicone rubber (supplied by General Electric Co.) about 0.025 mm. in thickness. The membrane was held taut across the bottom of the outer tube 19 by suitable holding device such as a band. Suitable spacers may be present to help support and center the rod and the electrode 12 carried thereby, within the outer casing. The counter electrode was a platinum wire of 0.6 mm. diameter which was wrapped five times around the 7 mm. glass tubing about 10 mm. above the platinized end of the glass tubing.

(A) For measuring $SO_2$ concentrations in air the liquid was an aqueous solution containing $AgNO_3$ in 0.01 M concentration and $Na_2HPO$ in 0.1 M concentration with the pH of the solution adjusted to a value of 2.7 by the addition of phosphoric acid (of 85% concentration). The voltage between the membrane-covered electrode and the counter electrode was maintained at 130 mv., with the membrane covered electrode being the positive electrode. The current was measured with a commercial amplifier (Model 157B of Rustrak Instruments, Manchester, N.H.), having an internal resistance of $10^5$ ohms. After 2 hours of operation in a stream of room air which was filtered through a column of "Ascarite" (or alkaline material retaining $SO_2$) the background current was $2 \cdot 10^{-9}$ amp. The device was then exposed successively to air containing increasing amounts of $SO_2$, the concentration of $SO_2$ being increased stepwise over the range of up to 5 v.p.m. (i.e. up to 5 volumes of $SO_2$ per million volumes of air). The increase in electrode current was substantially linearly proportional to the increase in $SO_2$ concentration ($8 \cdot 10^{-8}$ amperes per v.p.m. $SO_2$). In each case the response time (here defined as the time period for the current to reach at least 95% of its final value, at each concentration of $SO_2$) was below one minute. The device acted reversibly; thus, on exposure of the device to air substantially free of $SO_2$ the electrode current returned to the background value. Repeated tests showed the effect to be reproducible and to be substantially independent of, and not subject to interference by, the presence of other gaseous contaminants in the atmosphere; thus the presence of 50 v.p.m. of each of CO, $NO_2$ and $O_3$ did not change the current.

(B) Example 1A was repeated except that the liquid was an aqueous solution containing $AgNO_3$ in 0.01 M concentration, $CuSO_4$ in 0.01 M concentration, $Fe(NO_3)_3$ in $3 \cdot 10^{-4}$ M concentration, and $Na_2HPO_4$ in 0.1 M concentration, adjusted with $H_3PO_4$ to a pH of 2.7. The device gave a background current of less than $2 \cdot 10^{-9}$ amp after two hours of operation in $SO_2$-free room air. The device was then exposed successively to air containing increasing amounts of $SO_2$ being increased stepwise over the range of up to 5 v.p.m. $SO_2$. The current response was substantially linearly proportional to the $SO_2$ concentration (about $8.6 \cdot 10^{-8}$ amperes pere v.p.m.). The response time was below 1 minute, the effect was reproducible, and reversible and was not interfered with by the presence of 50 v.p.m. CO, $NO_2$ or $O_3$.

(C) Example 1A was repeated except that a silver wire of 1 mm. diameter was used as counter electrode. The results were identical to those described in Example 1A.

(D) Example 1A was repeated except that a commercial saturated calomel electrode (Coleman Instruments, Maywood, Ill.) was used as the counter electrode and a voltage of 650 mv. was applied, with the counter electrode being the positive electrode. The results were again identical to those of Example 1A.

(E) In order to demonstrate the effectiveness of the metal ion such as silver ion the device of Example 1D was operated with a liquid containing only 0.1 M $Na_2HPO_4$ in 0.1 M concentration, adjusted with $H_3PO_4$ to a pH of 2.7. The background current after 2 hours of operation was $2 \cdot 10^{-9}$ amperes. The device was then exposed successively to air containing $SO_2$ in concentrations of up to 5 v.p.m. The response was initially $3 \cdot 10^{-9}$ amp per v.p.m. $SO_2$ and decreased with time within one hour to about $1.4 \cdot 10^{-9}$ amp.

EXAMPLE 2

The sensing electrode was constructed from a cylindrical glass tube (a "gas dispersion tube") of which a large cylindrical portion (15 mm. in length and having an outer diameter of 10 mm.) was microporous, being made of fritted glass which, according to the manufacturer (Ace Glass, Inc., Vineland, N.J., catalog No. 7202–10) had a maximum pore diameter of 4–8 microns. The outer surface of the porous cylindrical part was slightly heated (to about 200° C.) and an aqueous solution containing about 0.1 g. of platinum chloride per ml. was applied to its outer surface. The preheating of the glass serves to confine the platinum salt to the surface and prevents the platinum solution from soaking the whole porous structure. The tube was then heated to red heat over a gas flame until all platinum salt formed an electrically conducting metallic layer serving as an electrode. Electrical contact was made between this metallic layer and a platinum wire (diameter 0.2 mm.) which was sealed onto the glass. The gas dispersion tube was closed with a rubber stopper, through which passed a silver wire, serving as counter electrode and an inlet tube for the electrode liquid. The gas dispersion tube was supported vertically coaxially in a vertical glass tube of 15 mm.

diameter which had an inlet for receiving the gas to be tested, at its upper end, and an outlet for the gas at its lower end, so that the gas flowed in a annular path over the porous platinum electrode. The electrode liquid was fed into the gas dispersion tube at the constant rate of 5 ml. per hour by means of a pump; and all of this electrode liquid (which was an aqueous solution containing $AgNO_3$ in $5 \cdot 10^{-3}$ M concentration and $Na_2HPO_4$ in 0.1 M concentration, with the pH of the solution adjusted to a value of 2.7 by the addition of phosphoric acid) flowed out through the porous electrode at the same constant rate, and fell, as droplets, into a waste container. A voltage of 0.15 volt was applied between silver electrode and the platinum porous electrode, with the latter being the positive electrode. The current flowing in the circuit was measured with a commercial Microammeter of 100 micro amperes range, having an internal resistance of 1700 ohms. The gas flow through the device was kept constant at a rate of 2 liters per minute. When the gas was $SO_2$-free air, a background current of less than 1 micro ampere was recorded. The device was then exposed successively to air containing increasing amounts of $SO_2$, the concentration of $SO_2$ being increased stepwise over the range of up to 1 v.p.m. The increase in current was substantially linearly proportional to the increase in $SO_2$ concentration (6 microamperes per 0.1 v.p.m. $SO_2$). The respone time, i.e. the time required for reaching 95% of the final current value, was about 10 seconds. A device of this type was found to be capable of detecting 0.005 v.p.c. of $SO_2$ or less.

To further characterize the microporous electrode used in this Example 2, a substantially identical gas dispersion tube (unplatinized) was first tested for porosity by filling it with water under pressure and, while holding it vertical and maintaining a hydrostatic head of 11 cm. of water (the 11 cm. being measured upwardly from the top of the microporous portion of the tube), measuring the rate of flow of the water through the microporous portion. The tube was then dried and treated to form the microporous platinum electrode thereon, in the manner previously described in this Example 2, and the measurement of porosity was repeated. The flow rate, measured before the platinization, was 0.8 ml./min.; after the platinization it was substantially the same (within at most 10%). On breaking the platinized tube, the platinum deposit was found, on visual inspection, to be present only in the outer 1 mm. (or less) of the 3 mm. thick microporous glass wall of the tube.

In the examples the term "v.p.m." refers to the number of volumes of the $SO_2$ per million volumes of total gas; this is essentially the same as the number of mols of $SO_2$ per million mols of total gas.

In the embodiment shown in FIG. 10 the gas to be tested is supplied through an inlet 81 and is directed against a porous platinum electrode 82 formed on the outer surface of a fritted glass plate 83 which closes one end of a cylindrical glass tube 84 containing electrolyte under super-atmospheric pressure. The electrolyte which is supplied through a supply pipe (not shown), passes through the porous plate and wets the platinum electrode. Immersed in the electrolyte is a counter electrode, such as metal wire 17, which (like the electrolyte supply pipe) passes through a stopper (e.g. of rubber, not shown), at the other end of the tube 84. The porous electrode 82 is in electrically conductive contact with a lead 85. The whole assembly is contained, and mounted, within a chamber 86; more particularly the chamber is made up of a glass T 87 having stoppers 88 and 89, the leg 91 of the T being sealed to a vessel (not shown) for receiving electrolyte 92 flowing off the porous electrode 82.

To prevent the formation of a thicker layer of electrolyte at the lower portion of the vertical face of the porous electrode, the configuration is such that there is a surface (e.g. the surface of the lower part of the tube 84) below the porous electrode on which surface the variable thickening of the electrolyte layer (as droplets thereof form and fall) occurs. A third electrode 93 (such as a platinum gauze) is situated between the counter electrode and the porous electrode. The three electrodes may be connected in an external circuit of the construction shown in FIG. 4.

In the embodiment shown in FIG. 11, the porous electrode 95 is cylindrical, being formed on the vertical cylindrical outer surface of a glass vessel 96 having a cylindrical porous fritted glass section 97 and mounted in a cylindrical chamber 98. The counter electrode 17 is immersed in the electrolyte 99, within the vessel 96, the electrolyte being supplied, under pressure, through an inlet 101. The gas to be analyzed is supplied through an inlet 103 and passes through the chamber 98 in a more or less annular path around the porous electrode, flowing parallel thereto over a relatively long path, to gas outlet 104. By using this arrangement I have attained a substantially coulometric response. The lower portion of the chamber may be fitted with a reservoir (not shown) for receiving waste electrolyte dropping from the bottom of vessel 96.

In the specific construction illustrated in FIG. 11, the counter-electrode is mounted in a tube 106 open at its bottom 107, within the vessel 96, and the third electrode (here designated as 108) is situated near the bottom of tube 106 and is connected to the external circuit (of the type shown in FIG. 4) through a lead 109. For convenience in filling the vessel 96 with electrolyte there is a valved (and normally closed) bleed outlet 111. The lead to the porous electrode is shown at 112.

In FIG. 12 the counter electrode (here designated as 116) is downstream of the porous electrode 95 (of the same construction, on a vessel 96, as in FIG. 11). The counter electrode is in contact with the film of flowing electrolyte passing from the porous electrode, which film provides an electrolytic path. No third electrode is shown in this FIG. 12, and it will be understood that the constructions shown in FIGS. 10, 11, 12, and 13 may be operated with or without a third electrode.

In FIG. 13 the main electrode, carrying the layer of electrolyte, is in the form of a wire 121 wound, helically in this case, tightly around a cylindrical glass support 122 onto which the electrolyte is distributed, through a cylindrical porous section (usually not metallized) 123, from the interior of a chamber 124 containing the electrolyte maintained under pressure (e.g., a gravity head or pressure from a pump supplying the electrolyte at constant rate). It will be understood that the counter electrode can be present within chamber 124 (as shown in FIGS. 10 and 11) or downstream of the main electrode (as shown in FIG. 12). A droplet of electrolyte leaving the support 122 is shown at 126.

As is conventional in this art, the meter or other readout device (e.g. the meter 31 and/or the recorder 64) is marked to indicate the concentration of the particular species being measured (in this case $SO_2$) directly rather than merely in amperes or other electrical units which must be converted to concentration of that species by means of a calibration table (just as the readout device of a conventional pH meter has indicia giving the pH reading directly and the readout devices of the commercial ozone meters have indicia giving ozone concentrations, in say p.p.m. or p.p.h.m. [parts per hundred million] directly). In FIG. 6 the scale 101 of meter 31 (having needle 102) is marked to be conveniently readable in p.p.m. $SO_2$, (p.p.m. is the commonly used term for parts per million which may mean parts in terms of weight, volume, or moles; the term "v.p.m.," meaning *volume* parts per million is more precise, but less often used). A typical scale may run from 0 to 1 p.p.m. with linear scaling since the current output of the sensor is substantially linearly related to the concentration. Such meter can also have a "multirange" scale (also shown in FIG. 6), the switching from one scale to another being effected by the use of a circuit as shown in FIG. 6, with the resistances of resistors 80 and 81 being in the ratio of 1:5, the higher resistance corresponding to the more sensitive scale (0–1 p.p.m.).

Another common means of utilizing one meter for several ranges is to use one scale and to provide the knob 105 which controls the step switch 84 (switching between resisters 80 and 81) with indicia showing the multiplication factor, as also shown in FIG. 6. As is conventional, the meter 31 has two controls for calibration: (a) an offset control (of well known construction, not shown) which permits one to set the meter to zero p.p.m. (when the sensor in contact with an environment containing none of the species to be measured or containing a predetermined base-line concentration of that species) even though a small background current, previously discussed, may be flowing; and (b) a gain control, of the continuously variable type (also of well known construction, not shown), which is used to adjust the meter reading to any value on the scale when the sensor is, during calibration, in contact with a known concentration (above the zero or base-line concentration) of that species. In addition to the continuously variable gain control, there may be a step-wise gain control (e.g., the arrangement of resistors 80, 81, 82, 83 and switch 84, in FIG. 6).

A preferred electrode structure, of which one embodiment is described in Example 1 is made by applying a thin coating of decomposable platinum compound (e.g., a platinum salt) onto a glass surface and then decomposing the platinum compound, as by heating, to form a thin layer of metallic platinum, whose thickness is less than 0.1 mm., e.g. of such thickness as to be translucent. Preferably there is a narrow unplatinized zone (or "rim") around the periphery of the platinized glass surface; this may be produced by applying the platinum to only the central portion of that face or by applying it over the whole face and abrading off the edge portions of the platinum. This rim serves as a spacer respect to the solution, insuring that the electrode is effected predominantly by substances (e.g. $SO_2$) entering the liquid at the electrode surface through the membrane rather than substances entering from around the edges of the electrode. Electrodes of this type are suitable not only for cells containing redox systems but are of general utility for electrochemical analysis. They are convenient, inexpensive and reliable and give a high stable current response to the species to be measured.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

What is clamied is:

1. Process for determining the concentration of $SO_2$ in a mixture, which comprises providing a cell having a first electrode, an electrolyte layer containing silver ions in contact with said first electrode, and a counter electrode,
   exposing said silver-containing electrolyte layer to to transfer of $SO_2$ from said mixture,
   applying a voltage across said electrodes to make said counter electrode negative, said electrodes introducing substantially no silver ions into said electrolyte, and
   measuring the amount of electrical current passing through said electrodes as a measure of $SO_2$ concentration.

2. Process as in claim 1 in which there is a membrane, permeable to sulfur dioxide, between said electrolyte layer and said mixture, and said layer is less than 3 mm. in thickness.

3. Process as in claim 2 in which said mixture is a gas in which sulfur dioxide is present in amount less than about 100 v.p.m.

4. The process of claim 2, in which the pH of said electrolyte layer is about 1.5 to 6 and its silver ion concentration is in the range $10^{-5}$ M to 0.1 M.

5. The process of claim 2, including the further step of providing a third electrode in said cell, said third electrode having about the same potential as said first electrode.

6. The process of claim 2, in which said electrolyte contains metal ions in addition to said silver ions.

7. The process of claim 2, where said cell and said mixture are maintained at a predetermined temperature during said $SO_2$ concentration determination.

8. Process as in claim 1 in which the pH of the electrolyte layer is about 1.5 to 6 and its silver ion concentration is in the range of $10^{-5}$ M to 0.1 M.

9. Process as in claim 1 including the steps of calibrating said cell by exposing it to at least two gas mixtures containing different known concentrations of $SO_2$.

10. The process of claim 9, in which there is a thin membrane, permeable to $SO_2$, between said electrolyte layer and said mixture, and said electrolyte layer is less than 3 mm. in thickness.

11. The process of claim 9, in which said mixture is a gas in which $SO_2$ is present in an amount less than about 100 v.p.m.

12. The process of claim 9, in which the pH of said electrolyte layer is about 1.5 to 6, and its silver ion concentration is in the range of $10^{-5}$ to 0.1 M.

13. The process of claim 9, in which there is a third electrode in said cell having about the same potential as said first electrode.

14. The process of claim 9, in which said voltage is at least 10 mv.

15. The process of claim 9, wherein said electrolyte contains metal ions in addition to silver ions.

16. The process of claim 9, wherein said cell and said mixture are maintained at a predetermined temperature during said $SO_2$ concentration determination.

17. The process of claim 1, including the further step of providing a third electrode in said cell, said third electrode having about the same potential as said first electrode.

18. The process of claim 1, in which said voltage is at least 10 mv.

19. The process of claim 1, where said electrolyte contains metal ions in addition to said silver ions.

20. The process of claim 1, wherein said cell and said mixture are maintained at a predetermined temperature during said $SO_2$ concentration determination.

21. The process of claim 1, wherein said electrolyte contains a phosphate buffer.

22. The process of claim 1 wherein said first electrode is comprised of an element selected from the group consisting of platinum and gold on an insulating body.

References Cited
UNITED STATES PATENTS

| | | | |
|---|---|---|---|
| 2,651,612 | 9/1953 | Haller | 204—195 R |
| 3,028,317 | 4/1962 | Wilson et al. | 204—1 T |
| 3,088,905 | 5/1963 | Glover | 204—195 P |
| 3,098,813 | 7/1963 | Beebe et al. | 204—195 P |
| 3,235,477 | 2/1966 | Keyser et al. | 204—195 P |
| 3,325,378 | 6/1967 | Greene et al. | 204—1 T |
| 3,328,277 | 6/1967 | Solomons et al. | 204—195 P |
| 3,380,905 | 4/1968 | Clark | 204—195 P |
| 3,406,109 | 10/1968 | Mollot | 204—195 P |
| 3,493,484 | 2/1970 | Berg et al. | 204—195 P |

TA-HSUNG TUNG, Primary Examiner

U.S. Cl. X.R.

204—195 R, 195 P